United States Patent [19]

Agree et al.

[11] Patent Number: 5,985,154
[45] Date of Patent: Nov. 16, 1999

[54] METHODS AND COMPOSITIONS FOR TREATING PAINT SPRAY BOOTH WATER

[75] Inventors: Howard B. Agree, Newtown; Barry P. Gunagan, Hatboro; Edward A. Rodzewich, Flourtown, all of Pa.

[73] Assignee: Betz Dearborn Inc., Trevose, Pa.

[21] Appl. No.: 09/015,147

[22] Filed: Jan. 29, 1998

[51] Int. Cl.⁶ .................................................. C02F 1/56
[52] U.S. Cl. .......................... 210/728; 95/152; 95/154; 134/38; 210/735; 210/736; 210/930; 427/331
[58] Field of Search .................... 95/152, 154; 210/712, 210/725, 727, 728, 735, 736, 930; 134/38; 252/180, 181; 427/331

[56] References Cited

U.S. PATENT DOCUMENTS

| | | | |
|---|---|---|---|
| Re. 28,807 | 5/1976 | Panzer et al. | 260/2 BP |
| Re. 28,808 | 5/1976 | Panzer et al. | 260/2 BP |
| 3,288,770 | 11/1966 | Butler | 260/88.3 |
| 3,515,575 | 6/1970 | Arnold | 210/930 |
| 3,861,887 | 1/1975 | Forney | 55/19 |
| 4,130,674 | 12/1978 | Roberts et al. | 252/180 |
| 4,185,970 | 1/1980 | Dean | 134/38 |
| 4,440,647 | 4/1984 | Puchalski | 210/712 |
| 4,525,515 | 6/1985 | Peignier et al. | 524/378 |
| 4,637,824 | 1/1987 | Pominville | 55/85 |
| 4,853,132 | 8/1989 | Merrell | 210/712 |
| 4,948,513 | 8/1990 | Mitchell | 210/705 |
| 5,024,768 | 6/1991 | Merrell | 210/712 |
| 5,060,682 | 10/1991 | Merrell | 134/38 |
| 5,073,205 | 12/1991 | Morse | 134/38 |
| 5,076,939 | 12/1991 | Hunter et al. | 210/712 |
| 5,098,450 | 3/1992 | Patzelt et al. | 210/712 |
| 5,147,557 | 9/1992 | Purnell | 210/712 |
| 5,147,558 | 9/1992 | Purnell | 210/712 |
| 5,240,509 | 8/1993 | Rey | 134/38 |
| 5,250,189 | 10/1993 | Rey | 210/712 |
| 5,294,352 | 3/1994 | Waldmann | 210/725 |
| 5,523,000 | 6/1996 | Falbaum et al. | 210/708 |
| 5,670,294 | 9/1997 | Piro | 430/331 |

FOREIGN PATENT DOCUMENTS 0525989  2/1993  European Pat. Off. .

*Primary Examiner*—Peter A. Hruskoci

[57] ABSTRACT

Methods and compositions for detackifying and dispersing, and coagulating/flocculating and dispersing solventborne and waterborne paints, respectively, in paint spray booth waters are disclosed. An aqueous composition of water soluble cationic polymer, nonionic surfactant and amphoteric surfactant is used in conjunction with a silicate compound to treat the paint spray booth waters.

26 Claims, No Drawings

METHODS AND COMPOSITIONS FOR TREATING PAINT SPRAY BOOTH WATER

FIELD OF THE INVENTION

The present invention pertains to a paint spray booth water treatment program. The program comprises detackifying and dispersing solventborne paints and coagulating, flocculating and dispersing waterborne paints, and mixed waterbome/solventborne paints.

BACKGROUND OF THE INVENTION

The spray painting of automobile bodies, truck parts, appliances and other industrial goods is typically carried out in enclosed areas called paint spray booths (PSBs). These booths act to contain solvent fumes and oversprayed paint and reduce the chances of dust contamination in order to protect the paint booth operators and the painted articles. These booths vary in size, but are somewhat basic in their design and operation. A typical booth would thus consist of a work area, back section with mist eliminators and a sump.

The articles to be painted generally pass through the work area while an air flow makes overspray contact either with water in the sump or spray from a water curtain. The air is scrubbed with recirculated water at the water curtain, passes through mist eliminators and is removed by an exhaust fan.

Even though paint transfer efficiencies have increased through improved application technologies, roughly one-half of all paint sprayed does not reach its intended article. As a result, significant concentrations of paint buildup in the system and agglomeration can occur. When solventborne paints are used, the resultant mass is a sticky, tacky material which can plug mist eliminators, shower heads, and even recirculating pumps. When waterborne paints are employed, they will remain dispersed in the spray booth water. When present, waterborne paints will not present the same problems as untreated solventborne paint (i.e., tackiness, clumps, etc.). However, failure to remove waterborne paints results in increasing COD (chemical oxygen demand) levels, increasing suspended solids, and increasing levels of foam. All of these conditions decrease water clarity.

When water quality decreases, scrubbing efficiency decreases leading to potentially hazardous conditions of unchecked paint emissions being discharged into the atmosphere. Such conditions may also present severe safety hazards to paint spray booth operators. The paint solids that are collected in the water can form suspensions which remain tacky and create expensive separation and disposal problems.

It is therefore desirable to treat paint spray booth water systems so as to reduce or prevent, as much as possible, the agglomeration and deposition of oversprayed paint on critical paint spray booth operating pads, to render the resultant sludge (in solventborne systems) non-tacky and easily removable, and to provide a water quality such that it can be recycled for use in the system.

The paint employed in typical paint spray booths fall into two generic classes, waterborne and solventborne. Currently, solventborne paints are predominant. However, increased restrictions upon the levels of volatile organic compound emissions are forcing industrial applications to switch to waterborne paints.

The differences in the two paint classification can be found in their formulations. Solventborne paint typically consists of organic solvents (such as xylene), resin binders, pigments and additives. In waterborne systems, water is substituted for the organic solvent. Thus, the resin binders, pigments, and additives must all be rendered water soluble or dispersible. Resins which are not water soluble can be stabilized with emulsifiers and cosolvents or be reformulated.

The behavior of a solventborne and a waterborne paint will differ when each becomes overspray in a wet paint spray booth. Waterborne paints will disperse in the aqueous medium, while solventborne paints agglomerate into a tacky mass and adhere to paint spray booth operating pads. Because of this behavior in water, in the past, the chemical process by which each paint type is treated differs. In order to remove waterborne paint from an aqueous medium, they should be considered as hydrophilic colloids which must be rendered hydrophobic. The stability of the compounds in water arises from the surface charge generated from carboxylic, aliphatic or aromatic hydroxyl groups on the polymer backbone. The process of destabilizing such solutions is termed coagulation. Flocculation follows in this treatment process whereby the destabilized particles are induced to come together, make contact and form large agglomerants.

Solventborne paints are hydrophobic and their treatment involves partially dispersing the paint particles in the aqueous medium via an anionic dispersant. The partially hydrophilic particles can then be treated to render them non-tacky. This process is referred to as detackification.

SUMMARY OF THE INVENTION

The present invention provides for methods and compositions for detackifying and dispersing solventborne paints and for coagulating, flocculating and dispersing waterborne paints in a paint spray booth. The methods comprising the addition of an effective amount of a composition comprising a water soluble cationic polymer, a nonionic surfactant and an amphoteric surfactant, in conjunction with a silicate.

DESCRIPTION OF THE RELATED ART

U.S. Pat. Nos. 5,147,557 and 5,147,558, Purnell, teach processes for detackifying and coagulating oversprayed waterborne and mixed waterborne and oil based paint particles in the water collection system of a paint spray booth. The processes comprise adding a blend of an inorganic anion and a cationic polymer selected from the group consisting of polydiallyidimethyl ammonium chloride, a condensation product of dimethylamine plus epichlorohydrin and a condensation product of dimethylamine plus ethylenediamine and epichlorohydrin.

U.S. Pat. No. 4,440,647, Puchalski, discloses a paint spray booth composition consisting of a polyamide-epichlorohydrin resin, a polymer formed from reacting hexamethylene diamine and ethylene chloride. An amphoteric metal salt is also added.

U.S. Pat. No. 5,060,682, Merrell, teaches methods for detackifying paint in a wet paint spray booth where water is employed to wash the air containing the oversprayed paint. This activator catalyzed detackification program (ACDP) utilized a solid phase, lyophobic sol, that is well dispersed in the water. The lyophobic sols are formed from soluble metal salts such as $Sr^{+2}$ and $Ba^{+2}$, or in combination with cationic or anionic polymers.

U.S. Pat. No. 4,948,513, Mitchell, teaches methods for detackifying spray booth water containing paint particles by adding a combination of hydrophilic/lipophilic quaternary ammonium repeat unit polymers or diallyidialkyl quaternary ammonium compounds and the reaction product of tannin, an amino compound and an aldehyde.

U.S. Pat. No. 5,073,205, Morse, teaches the use of copolymers of N-methylolacrylamide and methyldiallylamine as detackifiers of solventborne paints in the circulating water of water wash paint spray booths. U.S. Pat. No. 5,250,189, Rey, teaches methods of treating paint spray booth water by maintaining the pH and alkalinity of the PSB water and adding an aluminum salt and a flocculant to the water before contacting the oversprayed, waterborne paint. The aluminum salt can be aluminum chlorohydrate and the flocculant can be a cationic polyelectrolyte or quaternary ammonium polymer. Hunter et al., U.S. Pat. No. 5,076,939, teaches a method similar to Rey but substitutes an alumina coated silica sol for the aluminum salt in the process.

U.S. Pat. No. 4,637,824, Pominville, teaches a method for detackifying airborne paint particles captured in an aqueous wash stream by adjusting the pH to 7 to 12 with an alkali metal silicate and then contacting the paint wastes in the wash water with an amphoteric metal salt such as aluminum chloride and a poly(diallyidimethyl ammonium halide) polymer.

EP 0 525 989A2, Huang et al., teaches a method for detackification of oversprayed paint in wastewater by adding an amphoteric polymer and an aluminum salt. The amphoteric polymer contains both anionic and cationic mer units and preferably in the presence of (meth)acrylamide mer units.

DETAILED DESCRIPTION OF THE INVENTION

The present invention provides for methods and compositions for detackifying and dispersing solventborne paints and for coagulating, flocculating and dispersing waterborne paints in paint spray booth waters comprising adding to the paint spray booth water either step-wise or together an aqueous composition comprising a water soluble cationic polymer, a nonionic surfactant and an amphoteric surfactaht, with a silicate compound.

It has been discovered that both detackification of solventborne paints and coagulation and flocculation of waterborne paints can be achieved by the simultaneous or step-wise use of the cationic polymer and the silicate together. The silicate acts in a manner to "catalyze" the polymer and to accomplish the detackification and the coagulation and flocculation.

The addition of the combination of surfactants to the paint spray booth water will alleviate the problem of floating of the detackified paints and the subsequent need for removal by mechanical devices. The nonionic surfactant and amphoteric surfactant will disperse the detackified paints which are subsequently removed with the paint spray booth water. This represents an improvement over those detackification technologies which rely on flotation and subsequent mechanical removal.

The water soluble cationic polymers that are useful in the present invention are of low to medium molecular weights, i.e. between about 1,000 to 600,000 average molecular weight. Typically these polymers are water soluble or dispersible polyquaternary ammonium polymers such as the condensation product of dimethylamine and epichlorohydrin, as described in U.S. Pat. Reissue No. 28,807 to Panzer et al., the contents of which are wholly incorporated by reference to herein.

These polymers may also be the condensation product of dimethylamine, epichlorohydrin and ethylenediamine as described in U.S. Pat. Reissue No. 28,808, the contents of which are wholly incorporated by reference to herein.

The water soluble cationic polymer may also be a polydiallyldimethyl ammonium chloride as described in U.S. Pat. No. 3,288,770, the contents of which are wholly incorporated by reference to herein.

The key criteria between these types of polymers for purposes of the present invention is that they be water soluble. Preferably the water soluble cationic polymer is the condensation product of dimethylamine and epichlorohydrin.

The nonionic surfactants useful in the present invention generally have an HLB of about 9 to 15. Inclusive in this description are those surfactants such as ethoxylated primary alcohols, ethoxylated fatty alcohols, ethoxylated alkylphenols and alkanolamines of fatty acids.

Examples of these surfactants include but are not limited to an ethoxylated nonyl phenol having an HLB of 12.9, available as Surfonic® N-95 from Texaco Chemicals; an aliphatic polyether, available as Antarox® LF-330 from Rhone-Poulenc; an octylphenoxy polyethoxy ethanol having 12 to 13 moles ethylene oxide, available from Union Carbide as Triton® X102; and an ethoxylated linear alcohol available from Union Carbide as Triton® DF16.

The amphoteric surfactants that are useful in the present invention include but are not limited to an alkyl imino acid, monosodium salt available from Exxon Chemical Corp. as Amphoteric TC; iminodipropionate amphoteric, available as Amphoteric 400 from Exxon; sodium salt of a capryl imidazoline derivative, available from Mona Industries as Monateric Cy-No. 50%; and, 2-alkyl imidazoline amphoteric, available as Monateric LF Na-50% from Mona Industries.

Generally, the silicate compounds that are useful in the present invention are water soluble sodium, potassium and ammonium salts of metasilicate ($SiO_3^{-2}$), orthosilicate ($SiO_4^{-4}$), disilicate ($Si_2O_5^{-2}$), and mixed silicates ($Na_2O \cdot xSiO_2$) where x=2 to 5). Preferably, the silicate compound is silicate D which is available from BetzDearborn Inc. as Detac® 1444.

The composition in general comprises about 30 to 60 percent by weight of the water soluble cationic polymer and from 0.1 to 5.0 percent each by weight of the nonionic and amphoteric surfactant. The remainder of the composition being water, with tap water being preferable.

The inventive composition may be fed to the paint spray booth by conventional means and either separately or simultaneously with the separate feed of silicate compound. For purposes of the present invention, the inventive composition may be added at a rate of about 300 parts to about 5000 parts per million parts of paint spray booth water. Preferably this amount ranges from about 300 parts to about 1500 parts per million parts paint spray booth water.

Likewise, the either separately or simultaneously fed silicate compound may be fed in a range of about 250 parts to about 2500 parts per million parts of paint spray booth water.

The composition of the present invention provides good coagulation and flocculation of waterborne paints and detackification of solvent-borne paints, while dispersing both types of paints when the pH of this spray booth water is about 6 to about 10. This is typical of paint spray booths and the pH can be adjusted, if necessary, with an appropriate caustic or acid.

The compositions of the present invention can be employed in those paint spray booths where polyacrylic, polyester resin and epoxy based paints are used. These paints and resins can be further classified to include latexes, lacquers, enamels, and acrylics.

A preferred composition which is designated as Treatment A comprises 48.4 percent by weight of water soluble cationic polymer (methanamine, N-methyl-polymer with (chloromethyl) oxirane), 44.6 percent tap water, 3.9 percent of Surfonic® N-95 and 3.1 percent of Amphoteric TC.

In order to more clearly illustrate this invention, the data set forth below were developed. The following examples are included as being illustrations of the invention and should not be construed as limiting the scope thereof.

JAR TESTING PROCEDURE

A standard jar test procedure is used to determine the functional dosage levels and proper combination of cationic polymer and inorganic materials. The general procedure is to add 100 mL of tap water to a 120 mL jar. The treatment program is then added, and the bottle is capped and shaken to mix the contents.

One mL of an automotive paint (waterborne or solventborne) is then added to the jar. After vigorous shaking for 30 seconds, a wooden tongue depressor is immersed in the solution and then removed for examination.

The following guidelines are used for examining the detackification performance of the treatment.

| Rating | Definition |
| --- | --- |
| 1 | Paint forms large, tacky globules and/or coating which adheres to the exposed surfaces of the jar and tongue depressor. |
| 2 | Paint forms agglomerates which are slightly tacky to touch, or upon crushing. Paint sludge coats the tongue depressor. |
| 3 | Paint forms granular flocs which adhere to less than 10% of the exposed surface area of the jar or depressor. |
| 4 | Paint forms particles, some of which appear as specks on less than 1% of the exposed surface area of the jar or depressor. Sludge is neither smeary or tacky. |
| 5 | Paint forms particles which do not adhere to the exposed surfaces of the jar or depressor. The paint may float, sink, or be dispersed in the water. |

TABLE I

Comparison of Inventive Treatment A with Silicate D Versus DETAC ® 504X on Waterborne Paints

| Sample | Paint | Treatment Dosage (ppm) | Activator Dosage (ppm) | Floc | Dispersion |
| --- | --- | --- | --- | --- | --- |
| 1 | LD[1] | A (300) | 500 | Large | 90% Float |
| 2 | LD | A (600) | 500 | Large | 65% Float |
| 3 | LD | A (800) | 500 | Large | 65% Float |
| 4 | LD | A (800) | 1000 | Large | 100% Dispersed |
| 5 | LD | B (300) | 500 | Large | 90% Float |
| 6 | LD | B (500) | 500 | None | None |
| 7 | LD | B (200) | 1000 | Large | 100% Float |
| 8 | LD | B (400) | 1000 | Large | 90% Float |
| 9 | SW[2] | A (600) | 500 | Large | 75% Float |
| 10 | SW | A (800) | 500 | Large | 70% Float |
| 11 | SW | A (800) | 1000 | Large | 60% Float |
| 12 | SW | A (1200) | 1000 | Large | 100% Dispersed |
| 13 | SW | B (600) | 500 | None | None |
| 14 | SW | B (800) | 500 | None | None |
| 15 | SW | B (600) | 1000 | Large | 60% Float |

[1]Laurence-David Acrylic
[2]Sherwin-Williams Acrylic
A is Inventive Treatment
B is DETAC ® 504X as described in U.S. Pat. No. 5,024,768, Merrell, the contents of which are wholly incorporated by reference to herein.

The results provided for in Table I indicate that the inventive composition when utilized with Silicate D proved more effective than a traditional paint spray booth water treatment.

TABLE II

Comparison of Inventive Treatment A with Silicate D Versus DETAC ® on solventborne Paints

| Sample | Paint | Treatment Dosage (ppm) | Activator Dosage (ppm) | Kill | Dispersion |
| --- | --- | --- | --- | --- | --- |
| 1 | PPG[3] | A (400) | 1000 | 4– | 80% Floats |
| 2 | PPG | A (600) | 1600 | 3– | 60% Floats |
| 3 | PPG | A (600) | 2000 | 4– | 60% Dispersed |
| 4 | PPG | A (800) | 2000 | 4 | 80% Dispersed |
| 5 | PPG | C (400) | 1600 | 3+ | 100% Floats |
| 6 | PPG | C (600) | 1600 | 3+ | 100% Floats |
| 7 | PPG | C (400) | 2000 | 3– | 100% Floats |
| 8 | PPG | C (600) | 2000 | 2+ | 100% Floats |
| 9 | Dupont[4] | A (400) | 1600 | 2 | 80% Floats |
| 10 | Dupont | A (800) | 1600 | 3+ | 50% Dispersed |
| 11 | DuPont | A (400) | 2000 | 4/4+ | 70% Dispersed |
| 12 | DuPont | A (600) | 2000 | 4+ | 90% Dispersed |
| 13 | DuPont | C (400) | 1000 | 1 | 100% Floats |
| 14 | DuPont | C (800) | 1000 | 1 | 100% Floats |
| 15 | DuPont | C (400) | 1600 | 1 | 100% Floats |
| 16 | DuPont | C (800) | 1600 | 1 | 100% Floats |

[3]PPG Melamine Formaldehyde
[4]Dupont Polyester Melamine
A is inventive Treatment
C is DETAC ® 941 as described in U.S. Pat. No. 4,440,647, the contents of which are wholly incorporated by reference to herein.

As demonstrated in Table II, the use of the inventive treatment and the silicate compound provided excellent results at detackifying and dispersing solventborne paints.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for detackifying and dispersing solventborne paints in paint spray booth water comprising adding to said paint spray booth water an effective amount of an aqueous composition comprising a water soluble cationic polymer having a molecular weight of about 1000 to about 600,000, a nonionic surfactant and an amphoteric surfactant, in combination with an effective amount of a silicate compound, to detackify and disperse said solventborne paints, and reduce floatation of the detackfied paints.

2. The method as claimed in claim 1 wherein said water soluble cationic polymer is selected from the group consisting of the condensation product of dimethylamine and epichlorohydrin, the condensation product of dimethylamine, epichlorohydrin and ethylenediamine, and polydiallyldimethyl ammonium chloride.

3. The method as claimed in claim 1 wherein said nonionic surfactant has an HLB of about 9 to 15.

4. The method as claimed in claim 3 wherein said nonionic surfactant is selected from the group consisting of an ethoxylated nonyl phenol having an HLB of 12.9, an aliphatic polyether, an octylphenoxy polyethoxy ethanol having 12 to 13 moles ethylene oxide, and an ethoxylated linear alcohol.

5. The method as claimed in claim 1 wherein said amphoteric surfactant is selected from the group consisting of an alkyl imino acid, monosodium salt, an iminodipropionate amphoteric, a sodium salt of a capryl imidazoline derivative, and 2-alkyl imidazoline amphoteric.

6. The method as claimed in claim 1 wherein said silicate compound is selected from the group consisting of the sodium, potassium and ammonium salts of metasilicate, orthosilicate, disilicates and mixed silicates having the formula, $Na_2O \cdot xSiO_2$ where x is 2 to 5.

7. The method as claimed in claim 1 wherein said aqueous composition comprises from about 30 to 60 percent by weight of water soluble cationic polymer, and from about 0.1 to about 5 percent each of said nonionic and amphoteric surfactants.

8. The method as claimed in claim 1 wherein said aqueous composition and said silicate compound are added to said paint spray booth water simultaneously.

9. The method as claimed in claim 1 wherein said aqueous composition and said silicate compound are added to said paint spray booth water separately.

10. The method as claimed in claim 1 wherein said aqueous composition is added to said paint spray booth water in an amount ranging from about 300 parts to about 5000 parts per million parts of paint spray booth water.

11. The method as claimed in claim 1 wherein said silicate compound is added to said paint spray booth water in an amount ranging from about 250 parts to about 2500 parts per million parts paint spray booth water.

12. The method as claimed in claim 1 further comprising waterborne paints.

13. The method as claimed in claim 1 wherein said solventborne paint is selected from the group consisting of polyacrylic, epoxy and polyester resin-based paints.

14. A method for coagulating, flocculating and dispersing waterborne paints in paint spray booth water comprising adding to said paint spray booth water an effective amount of an aqueous composition comprising a water soluble cationic polymer having a molecular weight of about 1000 to about 600,000, a nonionic surfactant and an amphoteric surfactant, in combination with an effective amount of a silicate compound, to coagulate, flocculate, and disperse said waterborne paints, and reduce floatation of the coagulated and flocculated waterborne paints.

15. The method as claimed in claim 14 wherein said water soluble cationic polymer is selected from the group consisting of the condensation product of dimethylamine and epichlorohydrin, the condensation product of dimethylamine, epichlorohydrin and ethylenediamine, and polydiallyldimethyl ammonium chloride.

16. The method as claimed in claim 14 wherein said nonionic surfactant has an HLB of about 9 to 15.

17. The method as claimed in claim 16 wherein said nonionic surfactant is selected from the group consisting of an ethoxylated nonylphenol having an HLB of 12.9, an aliphatic polyether, an octylphenoxy polyethoxy ethanol having 12 to 13 moles ethylene oxide, and an ethoxylated linear alcohol.

18. The method as claimed in claim 14 wherein said amphoteric surfactant is selected from the group consisting of an alkyl imino acid, monosodium salt, an iminodipropionate amphoteric, a sodium salt of a capryl imidazoline derivative, and 2-alkyl imidazoline amphoteric.

19. The method as claimed in claim 14 wherein said silicate compound is selected from the group consisting of the sodium, potassium and ammonium salts of metasilicate, orthosilicate, disilicates and mixed silicates having the formula, $Na_2O \cdot xSiO_2$ where x is 2 to 5.

20. The method as claimed in claim 14 wherein said aqueous composition comprises from about 30 to 60 percent by weight of water soluble cationic polymer, and from about 0.1 to about 5 percent each of said nonionic and amphoteric surfactants.

21. The method as claimed in claim 14 wherein said aqueous composition and said silicate compound are added to said paint spray booth water simultaneously.

22. The method as claimed in claim 14 wherein said aqueous composition and said silicate compound are added to said paint spray booth water separately.

23. The method as claimed in claim 14 wherein said aqueous composition is added to said paint spray booth water in an amount ranging from about 300 parts to about 5000 parts per million parts of paint spray booth water.

24. The method as claimed in claim 14 wherein said silicate compound is added to said paint spray booth water in an amount ranging from about 250 parts to about 2500 parts per million parts paint spray booth water.

25. The method as claimed in claim 14 further comprising solventborne paints.

26. The method as claimed in claim 14 wherein said waterborne paint is selected from the group consisting of polyacrytic, epoxy and polyester resin based paints.

* * * * *